US012715476B2

(12) United States Patent
Tang et al.

(10) Patent No.: US 12,715,476 B2
(45) Date of Patent: Aug. 25, 2026

(54) VEHICLE RECOGNITION SYSTEM AND SERVER

(71) Applicant: Hitachi Astemo, Ltd., Hitachinaka (JP)

(72) Inventors: Chung Kim Tang, Tokyo (JP); Yuto Imanishi, Tokyo (JP); Yuma Kato, Tokyo (JP); Yasuhiro Fuse, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 79 days.

(21) Appl. No.: 18/838,035

(22) PCT Filed: Aug. 10, 2022

(86) PCT No.: PCT/JP2022/030657

§ 371 (c)(1),
(2) Date: Aug. 13, 2024

(87) PCT Pub. No.: WO2023/157343

PCT Pub. Date: Aug. 24, 2023

(65) Prior Publication Data

US 2025/0136153 A1 May 1, 2025

(30) Foreign Application Priority Data

Feb. 17, 2022 (JP) ................................ 2022-022747

(51) Int. Cl.
*B60W 60/00* (2020.01)
*G08G 1/01* (2006.01)

(52) U.S. Cl.
CPC ....... *B60W 60/0027* (2020.02); *G08G 1/0116* (2013.01); *G08G 1/0125* (2013.01);
(Continued)

(58) Field of Classification Search
CPC ......................... B60W 60/0027; G08G 1/0116
See application file for complete search history.

(56) References Cited

U.S. PATENT DOCUMENTS

2015/0187216 A1* 7/2015 Kwak .............. G08G 1/096775
701/117
2017/0032666 A1* 2/2017 Pretorius ............ G06K 7/10366
(Continued)

FOREIGN PATENT DOCUMENTS

JP 2014-174602 A 9/2014
JP 2020-193954 A 12/2020
JP 2021-105915 A 7/2021

OTHER PUBLICATIONS

Yuan et al, "Object Matching for Inter-Vehicle Communication Systems—An IMM-Based Track Association Approach With Sequential", 2017, IEEE (Year: 2017).*
(Continued)

*Primary Examiner* — Kenneth M Dunne
(74) *Attorney, Agent, or Firm* — Crowell & Moring LLP

(57) ABSTRACT

The present invention accurately identifies and tracks the pose of each of a plurality of vehicles within an ODD. An infrastructure sensor 5 transmits dynamic object ID information to a server upon detecting that a dynamic object 7 has reached an arbitrary feature point 4 on a travel path 3, the dynamic object ID information including a dynamic object ID for identifying the dynamic object 7 and information related to the time at which the dynamic object 7 reaches the feature point. Each of the plurality of vehicles 1 transmits vehicle ID information to the server 9 upon detecting that the vehicle has reached the feature point 4, the vehicle ID information including a vehicle ID for identifying the vehicle and information related to the time at which the vehicle reaches the feature point 4. The server 9 performs matching processing between the dynamic object ID information and the vehicle ID information to determine the presence or absence of a vehicle matching the dynamic object 7 among the plurality of vehicles 1.

6 Claims, 11 Drawing Sheets

(52) U.S. Cl.
CPC . *B60W 2554/4044* (2020.02); *B60W 2556/45* (2020.02); *B60W 2756/10* (2020.02)

(56) References Cited

U.S. PATENT DOCUMENTS

| | | | | |
|---|---|---|---|---|
| 2017/0132916 | A1* | 5/2017 | Ioli | G08G 1/005 |
| 2019/0311616 | A1* | 10/2019 | Jin | G05D 1/0297 |
| 2020/0020234 | A1* | 1/2020 | Cheng | G08G 1/0112 |
| 2021/0072041 | A1 | 3/2021 | Castorena Martinez et al. | |
| 2022/0068127 | A1* | 3/2022 | Lykkja | G06N 3/0464 |

OTHER PUBLICATIONS

Peng-Yong Kong, “Computation and Sensor Offloading for Cloud-Based Infrastructure-Assisted Autonomous Vehicles”, Sep. 2020, IEEE, (Year: 2020).*

International Search Report (PCT/ISA/210) issued in PCT Application No. PCT/JP2022/030657 dated Nov. 8, 2022 with English translation (6 pages).

Japanese-language Written Opinion (PCT/ISA/237) issued in PCT Application No. PCT/JP2022/030657 dated Nov. 8, 2022 with English translation (9 pages).

* cited by examiner 9
16
EDGE SERVER ANTENNA
17
EDGE SERVER COMPUTER
1
13
VEHICLE-MOUNTED ANTENNA
12
ECU
11
VEHICLE-MOUNTED SENSOR
5
15
RSU
14
SENSOR

| TIME STAMP | ID TYPE | ID NUMBER |
|---|---|---|
| 0.25 | VID | 01 |
| 0.25 | OID | 10 |
| 0.56 | VID | 02 |
| 0.56 | OID | 12 |
| 1.12 | OID | 11 |

| PAIR ID | [VID, OID] |
|---|---|
| 100 | [01, 10] |
| 101 | [02, 12] |

1
FEATURE POINT DETECTION UNIT
TIME LOGGER
DATA TRANSMISSION UNIT
22
23
24
5
DYNAMIC OBJECT DETECTION UNIT
OID ASSIGNMENT LOGIC UNIT
FEATURE POINT DETECTION UNIT
TIME LOGGER
DATA TRANSMISSION UNIT
25
26
27
28
29
9
MATCHING LOGIC UNIT
ID DATABASE
INITIAL VEHICLE POSE CALCULATION UNIT
30
31
32

42
EXIT
4
S202
ODD
43
S201
9
41
ENTRANCE

VEHICLE RECOGNITION SYSTEM AND SERVER

TECHNICAL FIELD

The present invention relates to a technology for increasing the level of autonomous driving of autonomous vehicles.

BACKGROUND ART

To achieve Level 4 autonomous driving, expensive sensors and processors are typically required. This is very important issue for owners of many Level 4 autonomous vehicles. This is because an increase in the number of vehicles increases significantly maintenance and hardware costs. To reduce these costs, a predetermined number of sensors can be installed in an infrastructure so that Level 2 vehicles including inexpensive sensors can achieve Level 4 autonomous driving within an operational design domain (ODD). The infrastructure sensors constantly monitor the ODD. Here, the ODD refers to the travel environment conditions under which each autonomous driving system operates, such as road conditions, conditions related to the distance from front and rear vehicles, speed conditions, and sensor detection conditions.

Furthermore, as disclosed in PTL 1 and the like, vehicle-to-infrastructure (V2I) technology enables vehicles to communicate with infrastructure services to obtain additional information to support autonomous driving. For example, the sensors installed in the infrastructure can cover vehicle blind spots to reduce the likelihood of traffic accidents, and issue warnings to approaching vehicles. The infrastructure itself can also announce the status of traffic signals. These V2I technologies can enhance vehicle autonomous driving capabilities. This means that it is possible to increase the level of autonomous driving without additional hardware in the vehicle.

CITATION LIST

Patent Literature

PTL 1: US 2021/0072041 A

SUMMARY OF INVENTION

Technical Problem

To increase the level of autonomous driving without adding expensive vehicle-mounted sensors, when multiple vehicles are moving within the ODD, a system providing V2I technology needs to accurately identify the position of each of the multiple vehicles within the ODD in order to provide useful information. In addition, the initial vehicle pose is required for an edge server, which receives and computes information from the infrastructure sensors, to accurately track the vehicle pose. Here, in the present invention, the vehicle pose refers to the coordinate position (x-y) and the direction (θ) of travel within the path along which the vehicle is traveling.

Solution to Problem

In order to the above problems, a vehicle recognition system according to the present invention includes: an infrastructure sensor that monitors a dynamic object moving on the travel path; and a server that receives information from a plurality of vehicles traveling on the travel path. In the vehicle recognition system, the infrastructure sensor transmits dynamic object ID information to the server upon detecting that the dynamic object has reached an arbitrary feature point on the travel path, the dynamic object ID information including a dynamic object ID for identifying the dynamic object and information related to a time at which the dynamic object reaches the feature point, each of the plurality of vehicles transmits vehicle ID information to the server upon detecting that the vehicle has reached the feature point, the vehicle ID information including a vehicle ID for identifying the vehicle and information related to a time at which the vehicle reaches the feature point, and the server performs matching processing between the dynamic object ID information and the vehicle ID information to determine presence or absence of a vehicle matching the dynamic object among the plurality of vehicles.

A server according to the present invention includes: receiving unit that receives dynamic object ID information from an infrastructure sensor that monitors a dynamic object moving on a travel path, and receives vehicle ID information from each of a plurality of vehicles traveling on the travel path, the dynamic object ID information including a dynamic object ID for identifying the dynamic object and information related to a time at which the dynamic object reaches an arbitrary feature point on the travel path, the vehicle ID information including a vehicle ID for identifying the vehicle and information related to a time at which the vehicle reaches the feature point; and a matching logic unit that performs matching processing between the dynamic object ID information and the vehicle ID information, to determine presence or absence of a vehicle matching the dynamic object among the plurality of vehicles.

Advantageous Effects of Invention

The present invention allows even vehicles, the functions of which are restricted to Level 2 autonomous driving, to operate fully autonomously within the ODD, i.e., in a state of Level 4 autonomous driving, without the need to install expensive vehicle-mounted sensors in each vehicle, through a mechanism based on predetermined rules. Thus, the present invention makes it possible to provide a less expensive alternative for achieving Level 4 autonomous driving.

Further features concerning the present invention will be clarified from the content of this description and the accompanying drawings. Objects, configurations, and effects other than the above will be apparent from the description of the following embodiments.

BRIEF DESCRIPTION OF DRAWINGS

FIG. 11 illustrates an example of communication failure.

DESCRIPTION OF EMBODIMENTS

First Embodiment

Hereinafter, an embodiment will be described with reference to the accompanying drawings.

Figure 1:
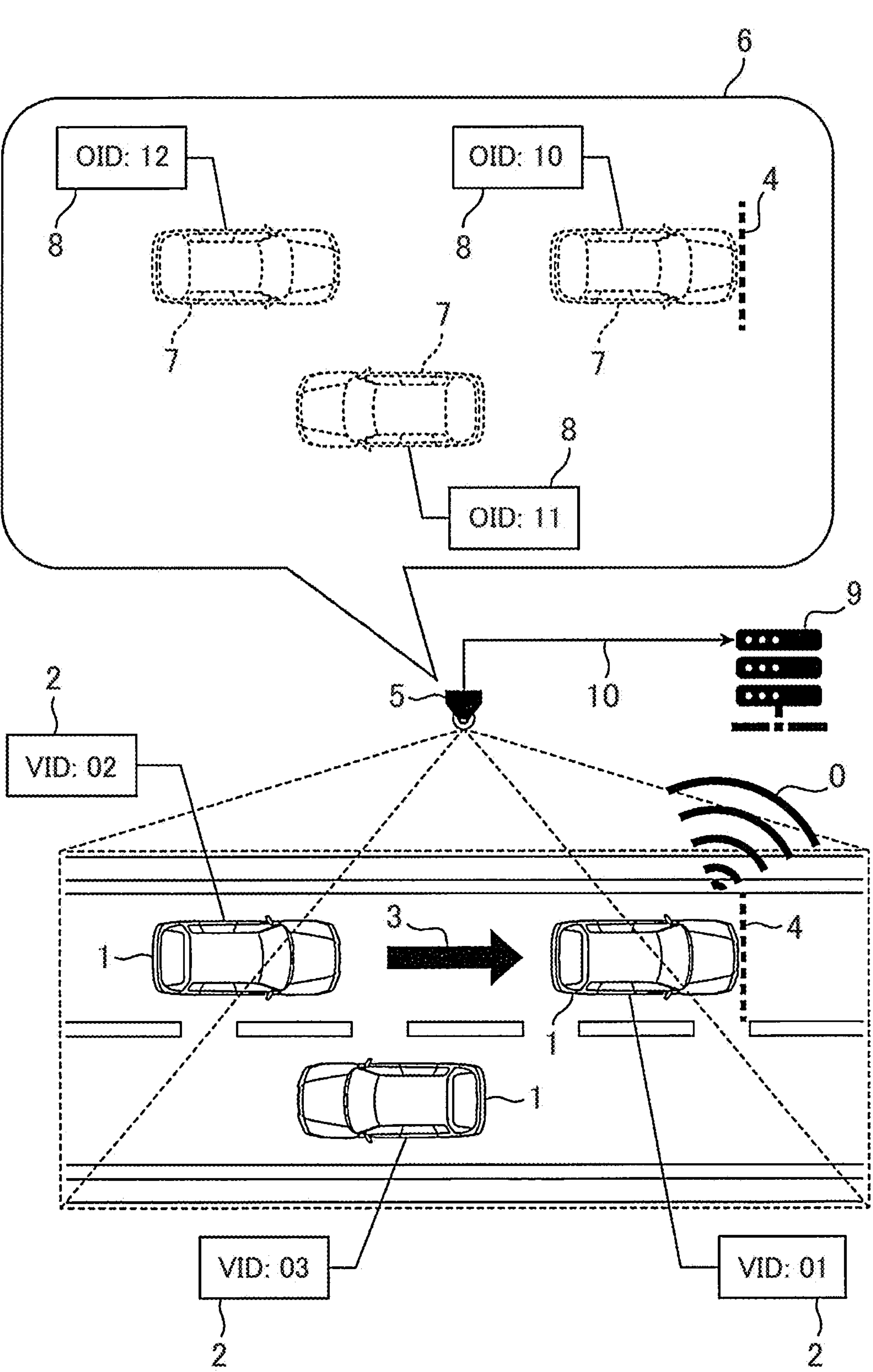
FIG. 1 is a block diagram illustrating an overview of a vehicle recognition system according to an embodiment of the present invention.

FIG. 1 is a block diagram illustrating an overview of a vehicle recognition system according to an embodiment of the present invention. A vehicle 1 is the automobile to be recognized. VID 2 is a unique ID that the vehicle 1 has. A predetermined travel path 3 is the area where the initial pose of the vehicle 1 is calculated and then tracked. Furthermore, the direction and position of traffic within the travel path 3 are known. A feature point 4 is a unique point within the travel path 3 which is detected by vehicle-mounted sensors. The position of the feature point 4 is also predetermined. An infrastructure sensor 5 is mounted on an infrastructure that is installed on the roadside of the travel path 3 and that monitors the ODD including the travel path 3. A sensor perception area 6 is a virtual space that represents the concept of the physical world observed by the infrastructure sensor 5. Within the sensor perception area 6, dynamic objects 7 are illustrated as mobile units detected by the infrastructure sensor 5. An OID 8 is a unique ID assigned to each of the dynamic objects 7 by the infrastructure sensor 5. An edge server 9 is a computer that processes data received from the vehicle 1 and the infrastructure sensor 5. An infrastructure sensor output 10 is data sent over a wired or wireless network from the infrastructure sensor 5 to the edge server 9. A vehicle output 0 is data sent from the vehicle 1 to the edge server 9 over a wireless network.

Figure 2:
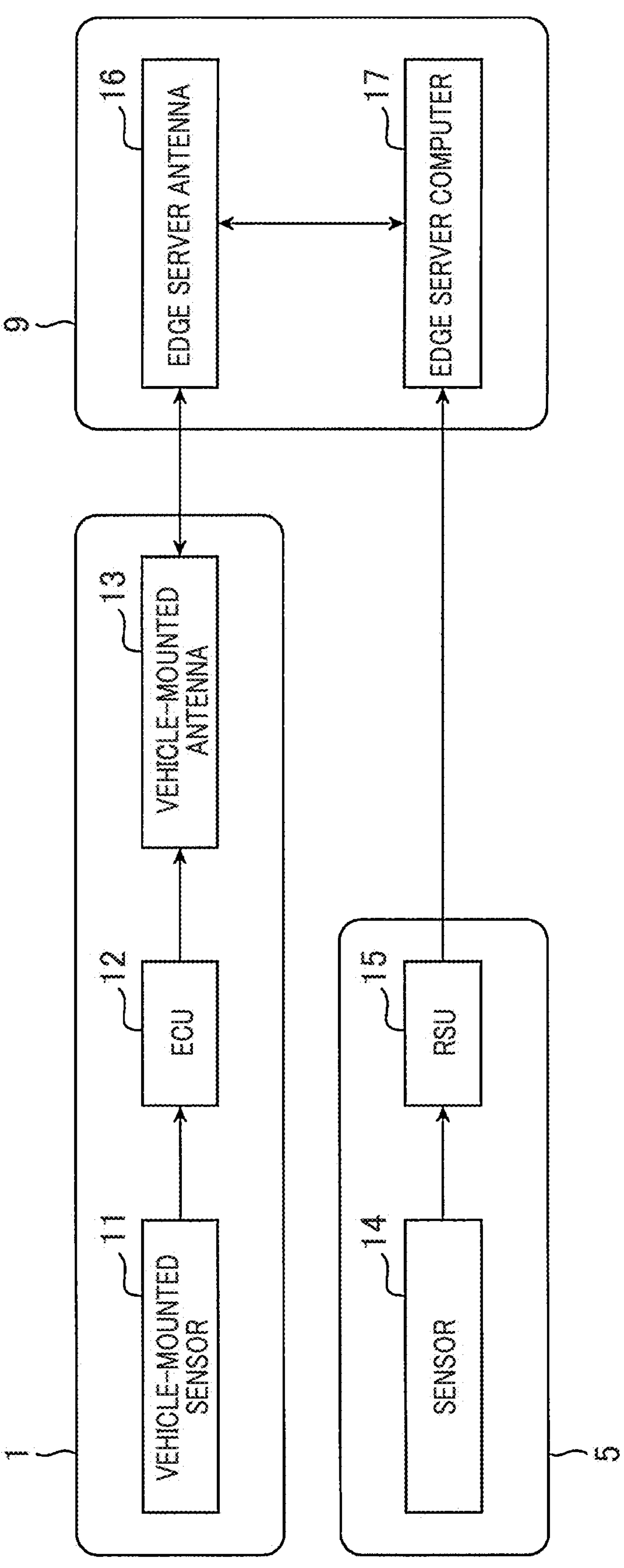
FIG. 2 is a block diagram illustrating an overview of a hardware configuration in which the vehicle recognition system is implemented.

FIG. 2 is an example of a hardware configuration in which the vehicle recognition system according to the present invention is implemented. The vehicle 1 is equipped with a vehicle-mounted sensor 11, an ECU 12, and a vehicle-mounted antenna 13. The vehicle-mounted sensor 11 is used to detect the feature point 4. The electronic control unit (ECU) 12 is a vehicle-mounted computer, which processes data and controls other vehicle-mounted devices in the vehicle 1. The vehicle-mounted antenna 13 is a device for transmitting and receiving data between the vehicle 1 and the edge server 9.

The infrastructure sensor 5 also has a sensor 14 and an RSU 15. The sensor 14 is a sensor device that is installed in the infrastructure so as to monitor the ODD including the predetermined travel path 3. The road side unit (RSU) 15 is a road side unit computer that preprocesses the data obtained from the sensor 14.

The edge server 9 also has an edge server antenna 16 and an edge server computer 17. The edge server antenna 16 is a device for transmitting and receiving data on the edge server 9. The edge server computer 17 processes data received from the vehicle 1 and the infrastructure sensor 5.

Figure 3:
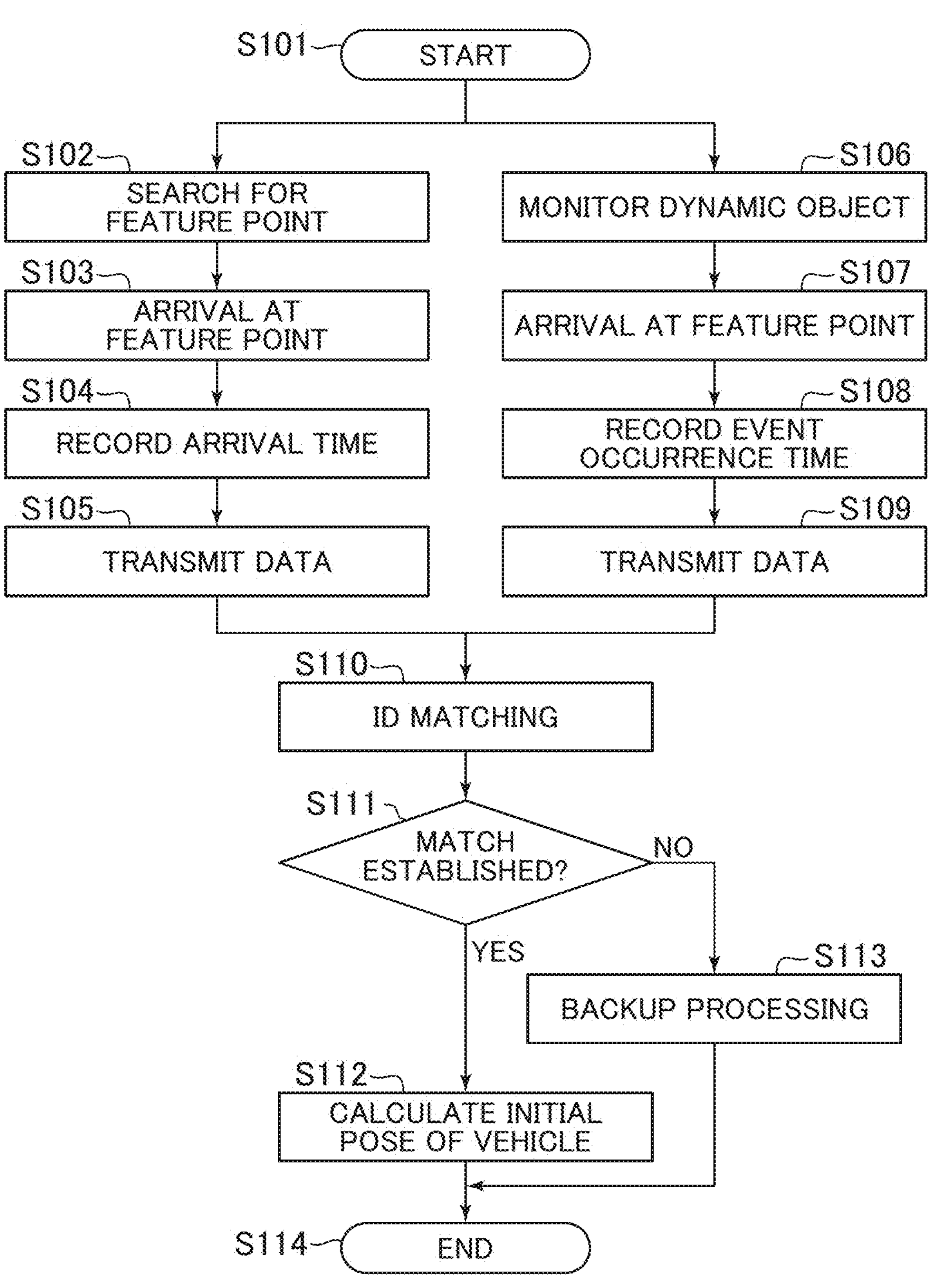
FIG. 3 is a flowchart illustrating the content of vehicle recognition processing performed using the vehicle recognition system.

FIG. 3 is a flowchart illustrating initial vehicle pose calculation processing performed by the vehicle recognition system according to the present invention. In step S101, the vehicle 1 reaches the predetermined travel path 3 and transmits its own VID 2 to the edge server 9. Thereafter, processing is carried out on the vehicle 1 side and on the infrastructure sensor 5 side. First, the processing carried out on the vehicle 1 side will be described. In step S102, the vehicle 1 starts searching for the feature point 4 using the vehicle-mounted sensor 11. In step S103, the vehicle-mounted sensor 11 detects that the vehicle 1 has reached the feature point 4. In step S104, the ECU 12 records the arrival time when the vehicle 1 reaches the feature point 4. In step S105, the vehicle 1 transmits its own VID 2 and the arrival time to the edge server antenna 16 of the edge server 9 via the vehicle-mounted antenna 13.

Next, the processing performed on the infrastructure sensor 5 side will be described. In step S106, the infrastructure sensor 5 detects a dynamic object 7 using the sensor 14 and starts tracking and monitoring. In step S107, the sensor 14 detects that the dynamic object 7 has reached the feature point 4. In step S108, the infrastructure sensor 5 uses the RSU 15 to record the time of the event in which the dynamic object 7 has reached the feature point 4. In step S109, the infrastructure sensor 5 transmits the OID 8 associated with the detected dynamic object 7 and the time of the arrival event to the edge server antenna 16 of the edge server 9 via the RSU 15.

When the edge server 9 receives data from both the vehicle 1 and the infrastructure sensor 5 as described above, the process proceeds to step S110, where the edge server 9 checks the VID 2 against the OID 8 using the time data. If a match is established in step S111, the process proceeds to step S112, where the edge server 9 calculates the initial vehicle pose of the vehicle 1. If a match is not established, the process proceeds to step S113, where backup processing is executed. Details of the matching processing, initial vehicle pose calculation processing, and backup processing will be described later. Thus, in step S114, it is determined that the initial vehicle pose calculation processing has been completed.

Figure 4:
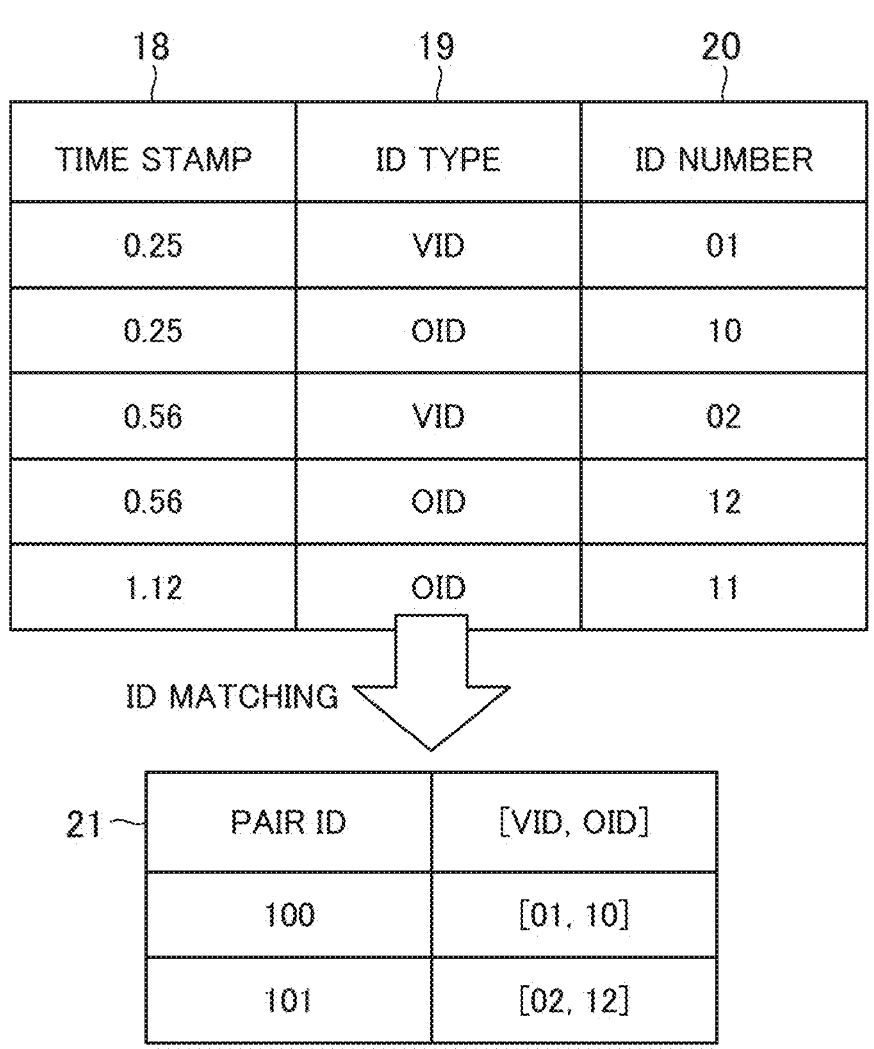
FIG. 4 is an example of an ID table in which the IDs of vehicles and dynamic objects are stored.

Details of the matching processing will be described with reference to FIG. 4. FIG. 4 is an example of an ID table that can be used in step S110 in FIG. 3. A time stamp 18 is time data recorded in the infrastructure sensor output 10 and the vehicle output 0. An ID type 19 indicates whether the recorded data belongs to the vehicle 1 or the dynamic object 7. An ID number 20 is an ID value unique to each of the vehicle 1 and the dynamic object. A pair ID 21 indicates the matched pair of VID 2 and OID 8.

As illustrated in FIG. 4, in the present embodiment, when the time stamp 18 is 0:25, a VID with ID number "01" and an OID with the ID number 20 being "10" are detected. Therefore, these are determined to be a matched pair, and "100" is assigned as the pair ID 21. Similarly, when the time stamp is 0:56, a VID with the ID number 20 of "02" and an OID with ID number "12" are detected, and the pair ID "101" is assigned thereto.

In addition, when the time stamp 18 is 1:12, an OID with the ID number 20 of "11" is detected, but the corresponding VID is not detected. In such cases, there may be an error in communication with the vehicle 1, or an object other than a vehicle, such as a person or animal, may have been detected as a dynamic object. In the latter case, there is no problem because the vehicle to be recognized does not exist, but in the former case, a vehicle cannot be recognized and tracked even though the vehicle is present within the ODD, resulting in a safety problem.

To prevent such a situation, if only an OID is received as described above, the edge server 9 extracts a VID for which a match has not yet been established from the list of VIDs received in step S101 in FIG. 3, identifies the vehicle 1 having the VID, and identifies the vehicle 1 as a vehicle having the VID that should match the OID for which the above match has not yet been established. This is the backup processing performed in step S113 in FIG. 3. If multiple VIDs for which the match is not established are extracted, the edge server 9 may instruct each of the vehicles 1 having the VIDs to transmit positional information.

Figure 5:
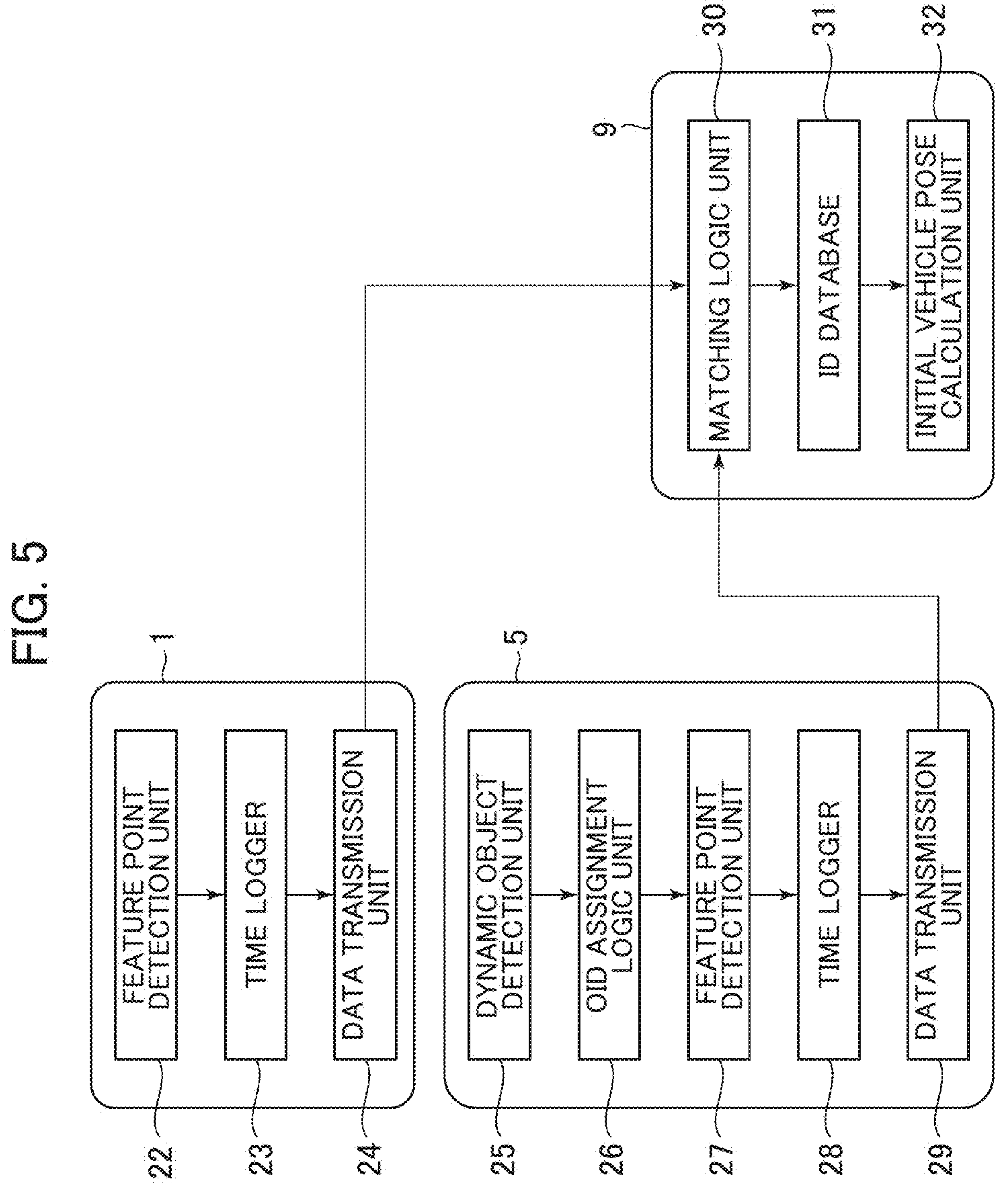
FIG. 5 is a block diagram illustrating the functional architecture of the vehicle recognition system.

FIG. 5 is a block diagram illustrating functional architecture for achieving initial vehicle pose calculation, which is implemented in the vehicle recognition system according to the present embodiment. The vehicle 1 is equipped with various ECUs that function as a feature point detection unit 22, a time logger 23, and a data transmission unit 24. The feature point detection unit 22 functions to find the feature point 4. The time logger 23 performs the function of recording the time that the vehicle 1 reached the feature point 4. The data transmission unit 24 performs the function of transmitting the vehicle output 0 to the edge server 9.

The infrastructure sensor 5 is also equipped with various ECUs that function as a dynamic object detection unit 25, an OID assignment logic unit 26, a feature point detection unit 27, a time logger 28, and a data transmission unit 29. The dynamic object detection unit 25 performs the function of processing sensor data and extracting information related to the dynamic object 7 therefrom. The OID assignment logic unit 26 performs the function of giving a unique ID to each of the detected dynamic objects 7. The feature point detection unit 27 performs the function of obtaining a trigger when the dynamic object 7 reaches the feature point 4. The time logger 28 performs the function of recording the time at which the feature point detection unit 27 detects that the dynamic object 7 has reached the feature point 4. The data transmission unit 29 performs the function of transmitting the infrastructure sensor output 10 to the edge server 9.

Similarly, the edge server 9 is equipped with various ECUs that function as a matching logic unit 30, an ID database 31, and an initial vehicle pose calculation unit 32. However, if the edge server is designed as a cloud on a network, these functions may be performed by software implemented as a program. The matching logic unit 30 performs the function of pairing the OID 8 with the VID 2 using the time stamp 18. The ID database 31 performs the function of storing the matched ID pair 21 in the storage device of the edge server 9. The ID database 31 also performs the function of storing, as a list, the VIDs that are transmitted to the edge server 9 when the vehicle 1 enters the travel path 3. The initial vehicle pose calculation unit 32 performs the function of calculating the position and orientation of the vehicle 1 on the basis of the observation data transmitted from the infrastructure sensor 5 when the match between the vehicle 1 and the dynamic object 7 is established.

Figure 6:
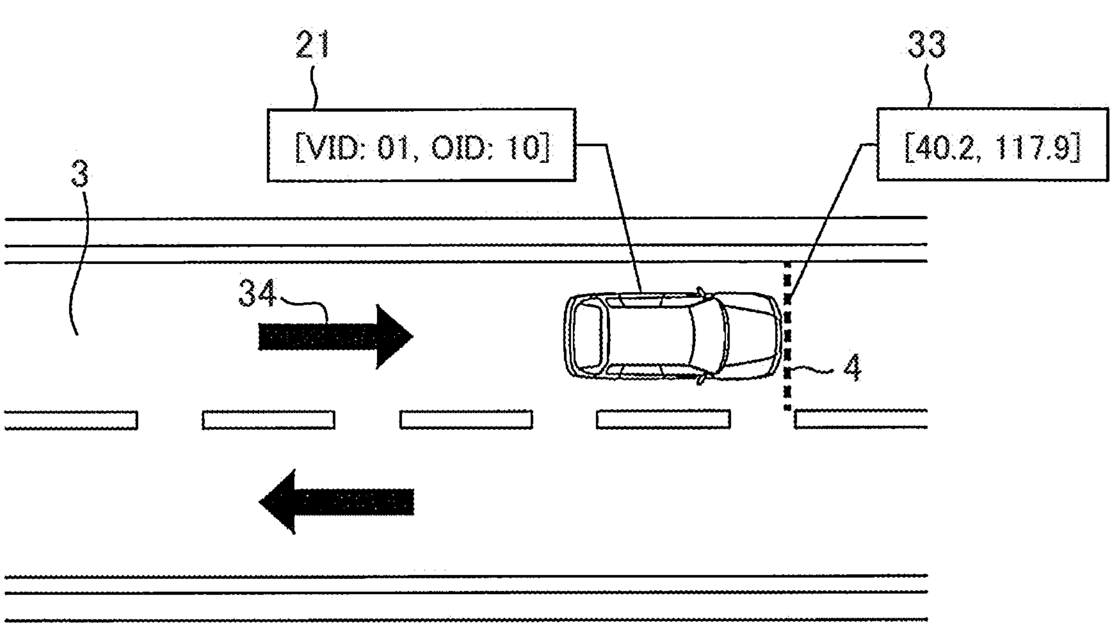
FIG. 6 is an example of a method for calculating an initial vehicle pose.

FIG. 6 illustrates an example of the initial vehicle pose calculation method performed in step S112 in FIG. 3. Coordinates 33 are the position of the predetermined feature point 4. In addition, a predetermined direction 34 is the traffic direction set for the travel path 3. When the vehicle 1 reaches the point at the coordinates 33 of the feature point 4, the vehicle 1 and the infrastructure sensor 5 perform the above-mentioned processing and transmit a set of ID and time stamp to the edge server 9. Then, the matching logic unit 30 performs the matching processing, and if a match is established, the initial vehicle pose calculation unit 32 calculates the position: "coordinates [40.2, 117.9]" and the direction: "driving direction 34" as the initial vehicle pose of the vehicle 1.

Figure 7:
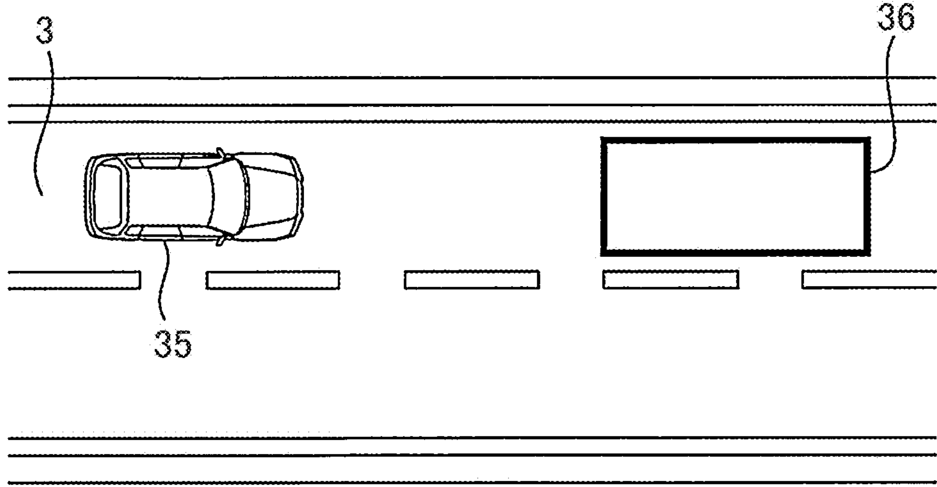
FIG. 7 is an example of feature point detection.

FIG. 7 illustrates an example of feature point detection using a vehicle as an example. A travel path maintenance camera 35 is the vehicle-mounted sensor 11 attached to the vehicle 1, and enables the vehicle 1 to detect and track lane markers on the travel path 3. In this example, a box-shaped marker 36 formed on the travel path 3 is detected as the feature point 4, using the travel path maintenance camera 35. Note that in FIG. 7, the feature point 4 is illustrated as the box-shaped marker 36.

Figure 8:
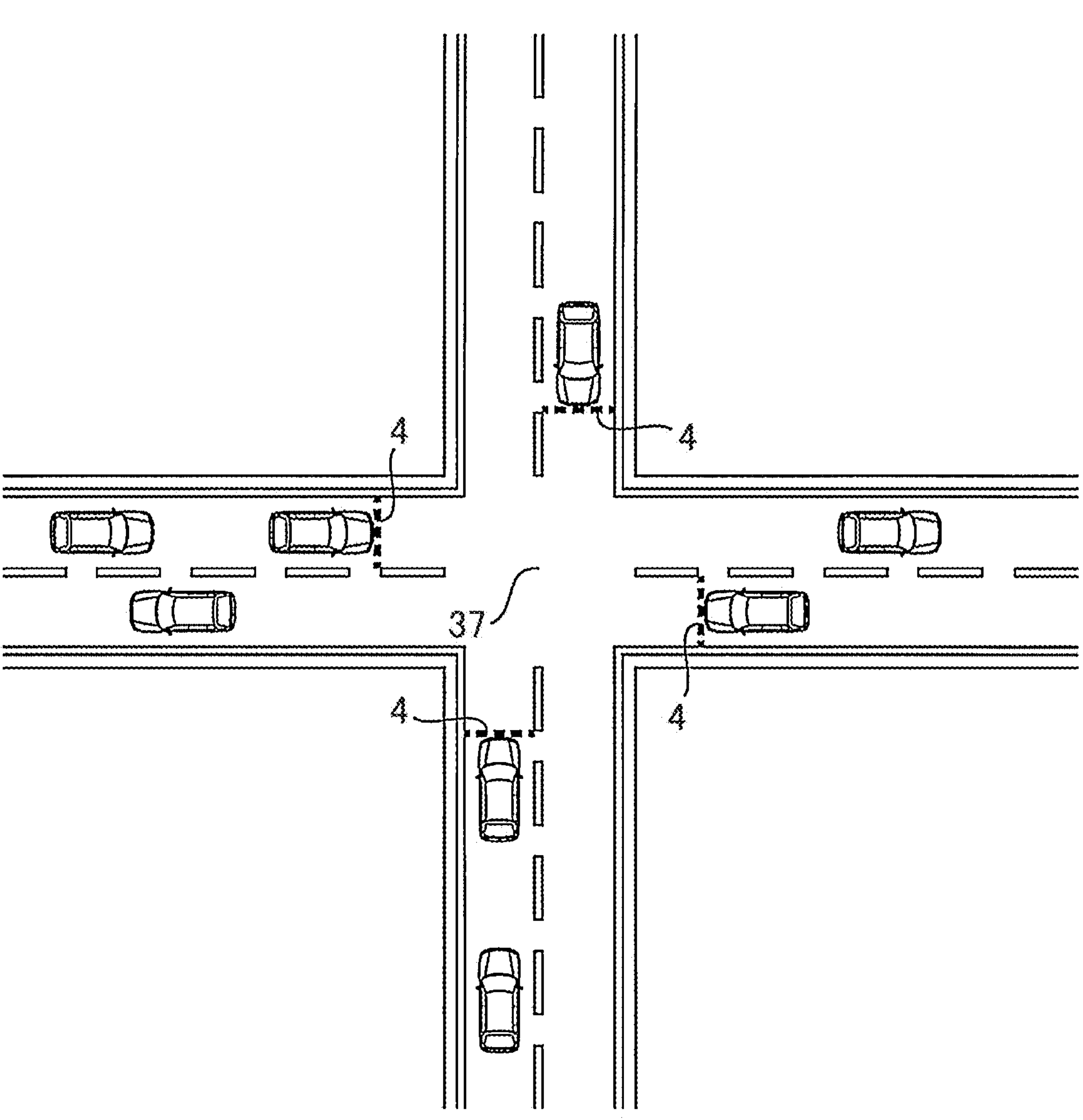
FIG. 8 is an example of the application of the system according to the present embodiment to an intersection.

FIG. 8 illustrates a case where the system according to the present embodiment is applied to an intersection on a public road. An intersection 37 is the ODD area where the position of the vehicle should be accurately tracked after the initial pose of the vehicle is calculated as a result of the processing illustrated in FIG. 3. In this case, the signal stop line can be treated as the feature point 4, thereby allowing the position of the vehicle 1 entering the intersection to be accurately tracked.

As described above, in the present embodiment, the markers, stop lines, and the like on the travel path are set as feature points, and when the vehicle reaches a feature point, the ID information and time stamps of the vehicle 1 and the dynamic object 7 are obtained from each of the vehicle 1 and the infrastructure sensor 5, and on the basis of those sets of information, the matching processing is performed to determine whether or not the vehicle 1 and the dynamic object 7 match. If a match is established, the initial vehicle pose of the vehicle 1 at the feature point 4 is calculated.

The relationship between the vehicle 1 and the dynamic object 7 having the VID and OID, respectively, that have been matched is the vehicle 1, and the dynamic object 7 that is the result of the vehicle being detected by the infrastructure sensor 5. Therefore, once a match is established, subsequent observations of the dynamic object 7 by the infrastructure sensor 5 are synonymous with the observations of the vehicle 1. Moreover, since the initial vehicle pose is calculated if a match is established, it is possible to track the vehicle with extremely high accuracy in both position and direction after a match is established. Therefore, the edge server 9 can control vehicle behavior within the ODD with extremely high accuracy using only the sensor information received from the existing infrastructure sensor 5. That is, it is possible to perform a higher level of autonomous driving without mounting expensive additional devices in the vehicle.

Second Embodiment

Figure 9:
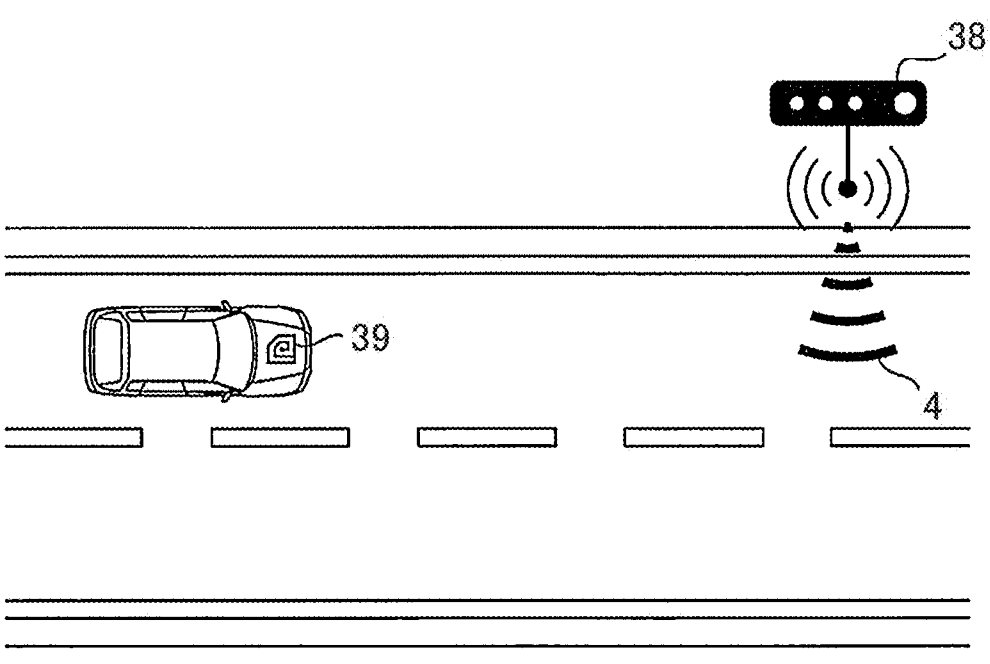
FIG. 9 is an example of feature point detection using a system according to a second embodiment.

FIG. 9 illustrates a method for detecting the feature point 4 using a vehicle as an example, according to a second embodiment. An RFID transmitter 38 is a transmitting device for generating the feature point 4 within the predetermined travel path 3. A vehicle-mounted RFID device 39 is a sensor for detecting the feature point 4 generated by the RFID transmitter 38, and corresponds to the vehicle-mounted sensor 11 in FIG. 2. By generating the feature point 4 using the RFID transmitter 38 installed on the roadside in this manner, the feature point 4 can be easily generated without the need for physical markings or the like on the travel path 3. In addition, by making the RFID transmitter 38 portable, it is possible to adjust the position and area where the feature point is generated, depending on the environment such as weather and road conditions.

Figure 10:
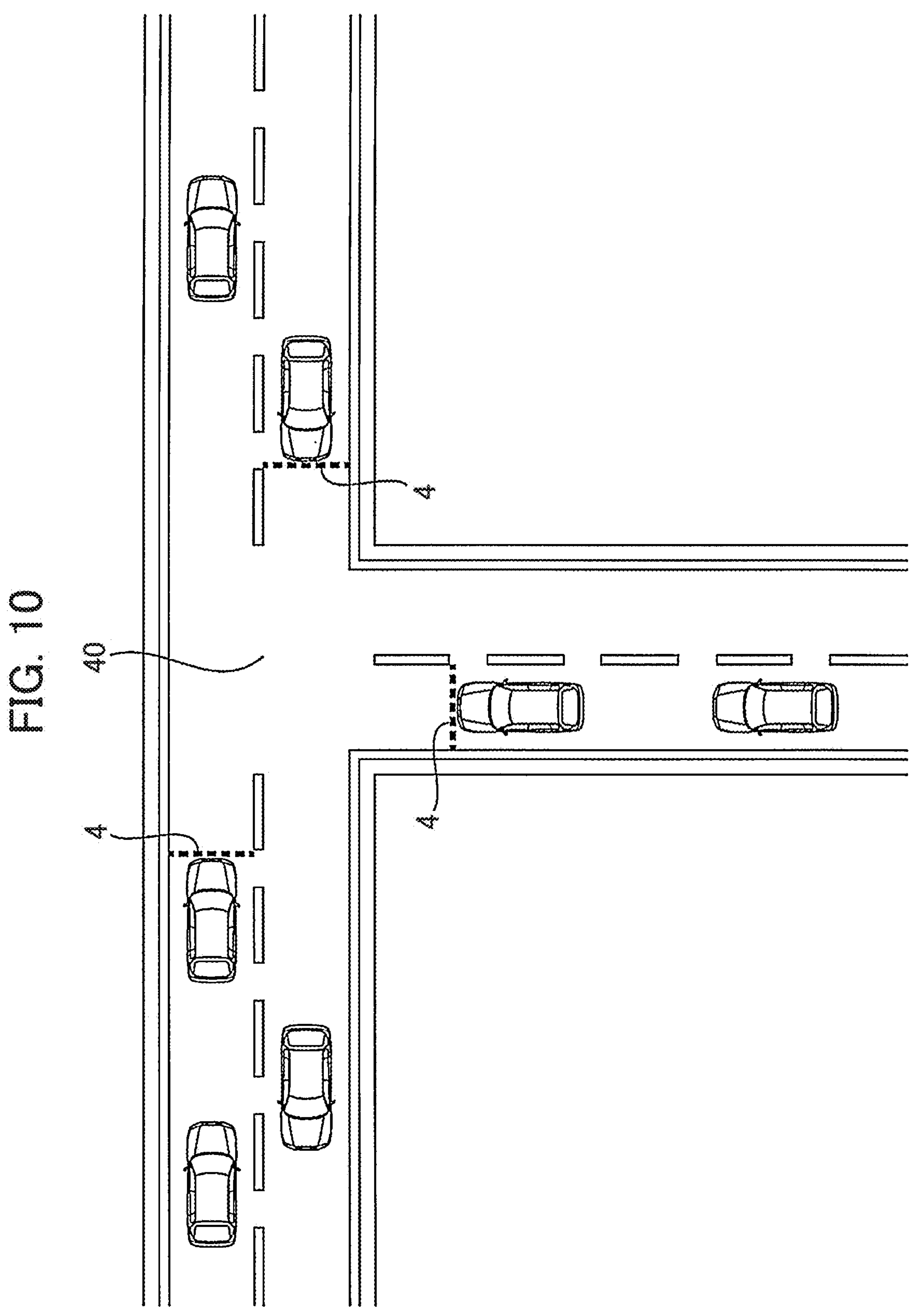
FIG. 10 is an example of the application of the system to a T-intersection.

FIG. 10 illustrates a situation in which the system according to the present embodiment is applied to a T-intersection 40. The T-intersection 40 is the ODD area where the position of the vehicle should be identified with high accuracy after completing the initial posing of the vehicle 1. Even in an area such as the T-intersection 40, the RFID transmitter 38 (see FIG. 9) can generate the feature point 4, thereby making it possible to achieve a higher level of autonomous driving using existing equipment, as in the first embodiment.

Third Embodiment

Figure 11:
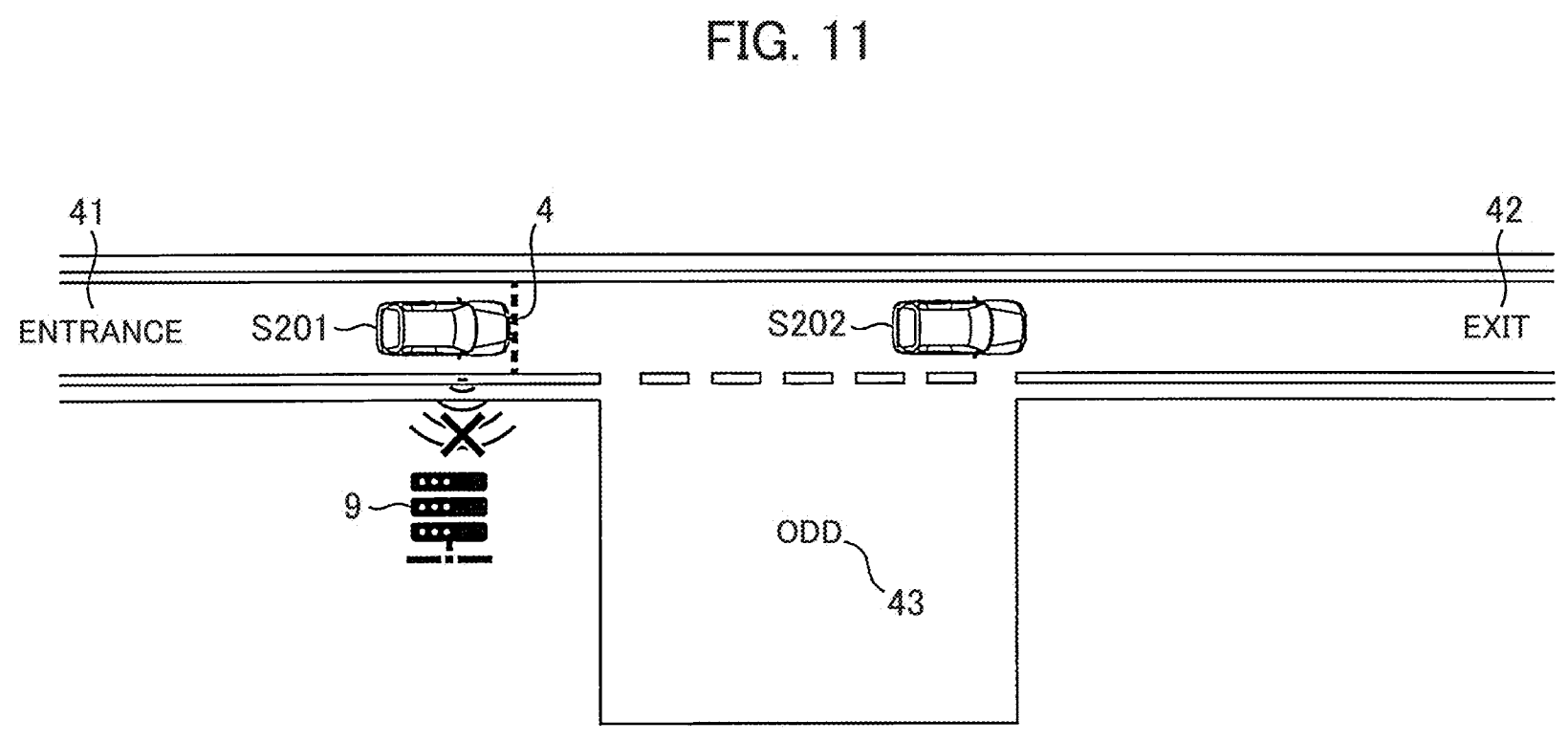

FIG. 11 illustrates an example of a case where communication failure occurs before the initial pose of the vehicle is calculated. An entrance 41 is the point where the vehicle 1 reaches the predetermined travel path 3, and an exit 42 is the point where the vehicle 1 leaves the travel path 3. An ODD 43 is the ODD area in which the position of the vehicle 1 should be accurately tracked after the initial pose of the vehicle 1 is calculated. If the vehicle 1 fails to communicate with the edge server 9 at the time at which the vehicle 1 reaches the feature point near the entrance 41 as illustrated in S201 in FIG. 11, the vehicle 1 does not change the autonomous driving level, maintains travel as illustrated in S202, and leaves the travel path 3 through the exit 42.

Figure 12:
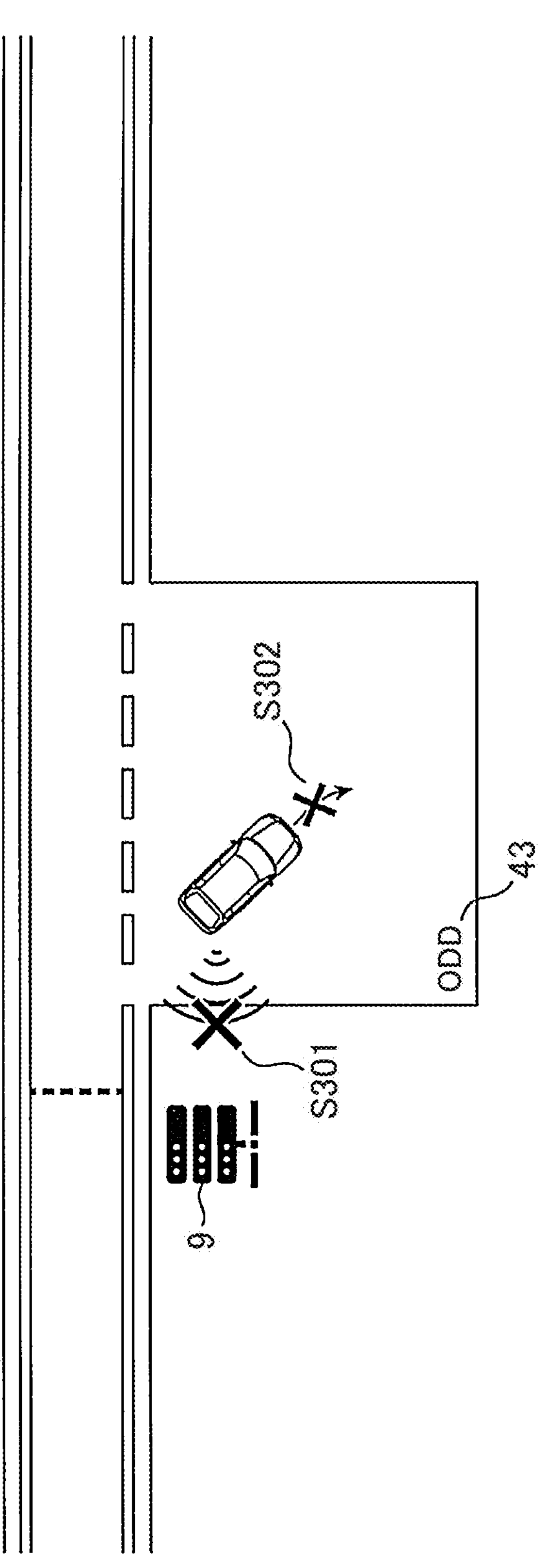
FIG. 12 illustrates another example of communication failure.

FIG. 12 illustrates another example of communication failure. If, after calculating the initial pose of the vehicle 1, the connection between the vehicle 1 and the edge server 9 is lost within the ODD, such as a parking lot, as illustrated in S301, the vehicle 1 is stopped as illustrated in S302 and waits until the connection between the vehicle 1 and the edge server 9 is restored.

If communication failure occurs before or after the initial pose of the vehicle 1 is calculated, by adopting the above-described method, it is possible to prevent the safety level from being endangered, thereby allowing the owner of vehicle 1 to safely introduce this system.

According to the above-described embodiments of the present invention, the following advantageous effects are obtained.

(1) The vehicle recognition system according to the present invention includes: the infrastructure sensor that monitors a dynamic object moving on the travel path; and the server that receives information from a plurality of vehicles traveling on the travel path. In the vehicle recognition system, the infrastructure sensor transmits dynamic object ID information to the server upon detecting that the dynamic object has reached an arbitrary feature point on the travel path, the dynamic object ID information including the dynamic object ID for identifying the dynamic object and information related to a time at which the dynamic object reaches the feature point, each of the plurality of vehicles transmits vehicle ID information to the server upon detecting that the vehicle has reached the feature point, the vehicle ID information including a vehicle ID for identifying the vehicle and information related to a time at which the vehicle reaches the feature point, and the server performs matching processing between the dynamic object ID information and the vehicle ID information to determine presence or absence of the vehicle matching the dynamic object among the plurality of vehicles.

The above configuration allows even vehicles, the functions of which are restricted to Level 2 autonomous driving, to operate fully autonomously within the ODD, i.e., in a state of Level 4 autonomous driving, without the need to install expensive vehicle-mounted sensors in each vehicle, through a mechanism based on predetermined rules. Thus, the present invention makes it possible to provide a less expensive alternative for achieving Level 4 autonomous driving.

(2) The infrastructure sensor observes a position and moving direction of the dynamic object on the travel path and transmits observation data including the observation results to the server, and upon determining that the vehicle matching the dynamic object is present, the server calculates the position and moving direction of the vehicle at the time at which the vehicle reaches the feature point on a basis of the observation data. Thus, the vehicle state (position and moving direction) at the time of arrival at the feature point can be identified, and the behavior after arrival at the feature point can be tracked by the infrastructure sensor, thereby enabling accurate ascertainment of vehicle behavior within the ODD and enabling Level 4 autonomous driving with high accuracy.

(3) Upon entering an operational area where the feature point is located, each of the plurality of vehicles transmits the vehicle ID to the server, and the server stores the vehicle IDs received from the plurality of vehicles, and if the dynamic object ID information has been received but the vehicle ID information matching the dynamic object ID information has not been received, the server performs backup processing to search for presence or absence of a vehicle ID that should match the dynamic object ID among the stored vehicle IDs. This allows the matching processing to be performed again even when a vehicle is unable to transmit the vehicle ID information due to communication problems or the like, thereby allowing an improvement in the accuracy of vehicle recognition.

(4) The feature point is a marker on the travel path, and the vehicle detects the feature point using a vehicle-mounted camera mounted on the vehicle. Further, the feature point is defined by a signal transmitted from an RFID communicator, and the vehicle detects the feature point using an RFID device that is mounted on the vehicle. This allows the feature point to be detected using existing cameras and communication equipment without the need for additional expensive equipment, thereby allowing minimal increase in cost.

(5) The server according to the present invention includes: the receiving unit that receives dynamic object ID information from an infrastructure sensor that monitors the dynamic object moving on the travel path, and receives vehicle ID information from each of a plurality of vehicles traveling on the travel path, the dynamic object ID information including a dynamic object ID for identifying the dynamic object and information related to a time at which the dynamic object reaches an arbitrary feature point on the travel path, the vehicle ID information including a vehicle ID for identifying the vehicle and information related to a time at which the vehicle reaches the feature point; and a matching logic unit that performs matching processing between the dynamic object ID information and the vehicle ID information, to determine presence or absence of a vehicle matching the dynamic object among the plurality of vehicles. This can be expected to produce the same effect as (1).

(6) The server receives observation data including observation results of a position and moving direction of the dynamic object on the travel path observed by the infrastructure sensor, and the server further includes an initial vehicle pose calculation unit that, when it is determined that the vehicle matching the dynamic object is present, calculates the position and moving direction of the vehicle at the time when the vehicle reaches the feature point in accordance with receipt of the observation data. This can be expected to produce the same effect as (2).

(7) When each of the plurality of vehicles enters an operational area where the feature point is located, the server receives and stores the vehicle IDs from the plurality of vehicles, and the server further includes a processing unit that, when the dynamic object ID information has been received but the vehicle ID information matching the dynamic object ID information has not been received, performs backup processing to search for presence or absence of a vehicle ID that should match the dynamic object ID among the stored vehicle IDs. This can be expected to produce the same effect as (3).

The present invention is not limited to the above-described embodiments, and further includes various modifications. For example, the above-described embodiments have been described in detail in order to facilitate the understanding of the present invention, and the present invention is not necessarily limited to those including all of the described configurations. In addition, part of the configuration of one embodiment can be replaced with the configurations of other embodiments. Further, in addition, the configuration of the one embodiment can also be added with the configurations of other embodiments. In addition, part of the configuration of each of the embodiments can be subjected to addition, deletion, and replacement with respect to other configurations.

LIST OF REFERENCE SIGNS

1 vehicle
2 VID (vehicle ID)
3 travel path
4 feature point
5 infrastructure sensor
7 dynamic object
8 OID (dynamic object ID)
9 edge server
11 vehicle-mounted sensor
14 sensor
16 edge server antenna (receiving unit)
17 edge server computer (processing unit)
30 matching logic unit
32 initial vehicle pose calculation unit

The invention claimed is:

1. A vehicle recognition system comprising:

a vehicle;

an infrastructure sensor that monitors a dynamic object moving on a travel path; and a server that receives information from a plurality of vehicles traveling on the travel path, wherein the infrastructure sensor transmits dynamic object ID information to the server upon detecting that the dynamic object has reached an arbitrary feature point on the travel path, the dynamic object ID information including a dynamic object ID for identifying the dynamic object and information related to a time at which the dynamic object reaches the feature point, each of the plurality of vehicles transmits vehicle ID information to the server upon detecting that the vehicle has reached the feature point, the vehicle ID information including a vehicle ID for identifying the vehicle and information related to a time at which the vehicle reaches the feature point, the server performs matching processing between the dynamic object ID information and the vehicle ID information to determine presence or absence of a vehicle matching the dynamic object among the plurality of vehicles, the server uses the matching processing to perform navigational control of the vehicle, upon entering an operational area where the feature point is located, each of the plurality of vehicles transmits the vehicle ID to the server, and the server stores the vehicle IDs received from the plurality of vehicles, and if the dynamic object ID information has been received but the vehicle ID information matching the dynamic object ID information has not been received, the server performs backup processing to search for presence or absence of a vehicle ID that should match the dynamic object ID among the stored vehicle IDs.

2. The vehicle recognition system according to claim 1, wherein the infrastructure sensor observes a position and moving direction of the dynamic object on the travel path and transmits observation data including the observation results to the server, and upon determining that the vehicle matching the dynamic object is present, the server calculates the position and moving direction of the vehicle at the time at which the vehicle reaches the feature point on a basis of the observation data.

3. The vehicle recognition system according to claim 1, wherein the feature point is a marker on the travel path, and the vehicle detects the feature point using a vehicle-mounted camera mounted on the vehicle.

4. The vehicle recognition system according to claim 1, wherein the feature point is defined by a signal transmitted from an RFID communicator, and the vehicle detects the feature point using an RFID device that is mounted on the vehicle.

5. A system comprising:

a vehicle; and a server, wherein the server includes a receiving unit that receives dynamic object ID information from an infrastructure sensor that monitors a dynamic object moving on a travel path, and receives vehicle ID information from each of a plurality of vehicles traveling on the travel path, the dynamic object ID information including a dynamic object ID for identifying the dynamic object and information related to a time at which the dynamic object reaches an arbitrary feature point on the travel path, the vehicle ID information including a vehicle ID for identifying the vehicle and information related to a time at which the vehicle reaches the feature point; and a matching logic unit that performs matching processing between the dynamic object ID information and the vehicle ID information, to determine presence or absence of a vehicle matching the dynamic object among the plurality of vehicles, wherein the server uses the matching processing to perform navigational control of the vehicle, when each of the plurality of vehicles enters an operational area where the feature point is located, the server receives and stores the vehicle IDs from the plurality of vehicles, and the server further comprises a processing unit that, when the dynamic object ID information has been received but the vehicle ID information matching the dynamic object ID information has not been received, performs backup processing to search for presence or absence of a vehicle ID that should match the dynamic object ID among the stored vehicle IDs.

6. The system according to claim 5, wherein the server receives observation data, including observation results of a position and moving direction of the dynamic object on the travel path observed by the infrastructure sensor, and the server further comprises an initial vehicle pose calculation unit that, when it is determined that the vehicle matching the dynamic object is present, calculates the position and moving direction of the vehicle at the time when the vehicle reaches the feature point in accordance with receipt of the observation data.

* * * * *